United States Patent
Seshadri

(10) Patent No.: US 11,804,948 B2
(45) Date of Patent: Oct. 31, 2023

(54) SIGNALING TECHNIQUES IN THE PRESENCE OF PHASE NOISE AND FREQUENCY OFFSET

(71) Applicant: Hughes Network Systems, LLC, Germantown, MD (US)

(72) Inventor: Rohit Iyer Seshadri, Gaithersburg, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 17/555,156

(22) Filed: Dec. 17, 2021

(65) Prior Publication Data

US 2023/0198736 A1    Jun. 22, 2023

(51) Int. Cl.
*H04L 7/04* (2006.01)
*H04L 1/00* (2006.01)

(52) U.S. Cl.
CPC .............. *H04L 7/048* (2013.01); *H04L 1/005* (2013.01); *H04L 1/0052* (2013.01); *H04L 1/0054* (2013.01)

(58) Field of Classification Search
CPC ..... H04L 1/005; H04L 1/0051; H04L 1/0045; H04L 1/0047; H04L 1/0052; H04L 27/38; H04L 27/22; H04L 7/0016; H04L 7/0054; H04L 7/0079; H04L 7/041; H04L 7/048; H04L 27/2657
See application file for complete search history.

(56) References Cited

U.S. PATENT DOCUMENTS

| | | | | |
|---|---|---|---|---|
| 6,968,021 B1* | 11/2005 | White | ..................... | H04L 1/005 714/799 |
| 7,421,041 B2* | 9/2008 | Khandekar | ............. | H04L 1/005 375/345 |
| 7,602,863 B2* | 10/2009 | Kovintavewat | ... | H04L 25/03337 375/365 |
| 8,040,985 B2* | 10/2011 | Montekyo | ............... | H04L 1/005 375/346 |

OTHER PUBLICATIONS

E. Casini et al., "DVB-S2 modem algorithms design and performance over typical satellite channels", International Journal of Satellite Communications and Networking, 2004, 22, pp. 281-318.
International Search Report and Written Opinion Issued in PCT Application No. PCT/US2022/051129, dated Mar. 10, 2023, 11 pages.
Barbieri et al., "Joint Iterative Detection and Decoding in the Presence of Phase Noise and Frequency Offset," IEEE Transactions on Communications, vol. 55, No. I, Jan. 2007, pp. 171-179.

* cited by examiner

*Primary Examiner* — Betsy Deppe
(74) *Attorney, Agent, or Firm* — NovoTechIP International PLLC

(57) ABSTRACT

Systems and methods are provided for enabling reliable signaling in the presence of strong phase noise and frequency offset. To this end, a method is provided comprising receiving, at a receiver, a communication signal, including data, from a transmitter via a communication channel, and jointly tracking and jointly correcting phase noise errors and frequency errors in the communication signal with a joint detector using an iterative feedback correction process between an output decoder of the receiver and the joint detector.

19 Claims, 10 Drawing Sheets

US 11,804,948 B2

SIGNALING TECHNIQUES IN THE PRESENCE OF PHASE NOISE AND FREQUENCY OFFSET

TECHNICAL FIELD

The present application relates to improved signaling techniques, and, in particular, to systems and methods for enabling reliable signaling in the presence of strong phase noise and frequency offset.

BACKGROUND

Oscillators employed for up-conversion at the transmitter and down-conversion at the receiver are vital components of communication systems. It is often desirable to keep device cost low, for instance when considering emerging applications such as massive machine-type communications (mMTC) and internet-of-things (IoT) that are characterized by sporadic, short-length, low-rate data transmissions generated by numerous low-cost devices. Low device cost in turn necessitates the use of low-cost oscillators that are prone to instabilities. Oscillator instability introduces jitter at its output which manifests in baseband as random, time-varying phase rotations to the modulated symbols, a phenomenon known as phase noise (PN). Phase noise problems are further exacerbated by the presence of a residual frequency offset or error. Mitigation of these impairments is typically done in two separate stages, the first being a (fine) frequency estimation stage and the second being a phase noise compensation stage. Both stages typically form explicit estimates of their respective distortion using known symbols, i.e., pilots. Phase noise and frequency errors can severely impair the energy-efficiency and spectral efficiency of the communication link. Regarding this, although each of the separate stages for correcting phase noise and frequency errors generally operate satisfactorily, a significant problem exists in that these two separate stages frequently go out of synchronization with each other, making it very difficult for the receiver to accurately process the transmitted signal.

Reliable signal detection in the presence of phase noise is a fundamental problem in communication systems, and the prior solutions can be broadly classified into two categories. The first category encompasses transmitter centric solutions that redesign the signal constellation to provide larger angular distance between adjacent symbols. Examples include the use of highly irregular two-dimensional constellations. The main drawback of these constellations is the difficulty in assigning an effective bit-to-symbol mapping rule, which results in the constellations having a poor bit-error rate despite exhibiting good symbol error rate performance. Since state-of-the-art systems employ binary forward error correction (FEC) codes (e.g., DVB-S2/S2X LDPC code), the modified constellations will also have poor packet error rate performance. Hence these constellations find limited application in pragmatic systems.

The second category of solutions are widely adopted and involve application of carrier phase recovery techniques at the receiver aided by pilot symbols. Here, two paradigms are seen in the literature. The first family of techniques make use of explicit phase noise estimates during symbol detection. As an example, some systems employ the use of groups of pilot symbols inserted at regular intervals in the transmitted burst of information symbols. Each group of pilots provides a single estimate of the phase noise, and linear interpolation is applied between consecutive pilot groups to obtain an estimate of the phase noise affecting the data portion in-between two pilot groups. Phase noise mitigation is performed explicitly by multiplying every sample at a matched filter output by the complex conjugate of the corresponding phase noise estimate. However, this process can become unreliable when the phase noise is severe and when the spacing between pilot groups is increased to reduce overhead, especially in the presence of residual frequency errors. To address this limitation, it has been proposed to use the expected values of the data symbols which can be derived from soft information provided by the FEC decoder to improve phase noise estimates over the non-pilot segments of the received signal. It is noted that such previous systems do not exploit statistical knowledge of the time-varying noise in generating symbol log-likelihood ratios (LLR).

In contrast, other approaches have used detectors based on assigning a statistical (canonical) model to the phase noise conditional probability density function (pdf). In some systems the maximum likelihood (ML) symbol detector is obtained by marginalizing the joint (i.e. symbol and unknown phase) pdf using the phase noise pdf. The choice of the canonical model will influence factors such as complexity, phase tracking ability, sensitivity to pilot distribution etc. A straightforward approach is to model the distribution as a probability mass function such that PN can assume L discrete values e.g., $\{0, 2\pi/L, \ldots, 2\pi(L-1)/L\}$, where $L \geq 8$ M is required for optimum performance (noting that the variable M is a modulation symbol, as discussed below with regard to branch metric updates, known as modulation cardinality, also sometimes referred to as constellation size). An alternative detector assumes that the phase noise follows a Tikhonov pdf which approaches the performance of the more complex discretized phase receiver at significantly lower complexity. Detectors based on a statistical model are known in the literature to perform better in the presence of strong phase noise.

To effectively track the phase noise, it is necessary to keep the frequency error as small as possible. Hence, conventional receivers employ a fine frequency estimation stage prior to carrier phase recovery. In such conventional receivers, data aided techniques are generally applied that can result in additional overhead and increase the acquisition time.

SUMMARY

A method is provided that includes receiving, at a receiver, a communication signal, including data, from a transmitter via a communication channel, and jointly tracking and jointly correcting phase noise errors and frequency errors in the communication signal with a joint detector using an iterative feedback correction process between an output decoder of the receiver and the joint detector.

A receiver is provided that includes a down-converter and filter of the receiver configured to receive a communication signal, including data, from a transmitter via a communication channel, and a joint detector configured to jointly track and jointly correct phase noise errors and frequency errors in the communication signal using an iterative feedback correction process between an output decoder of the receiver and the joint detector.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
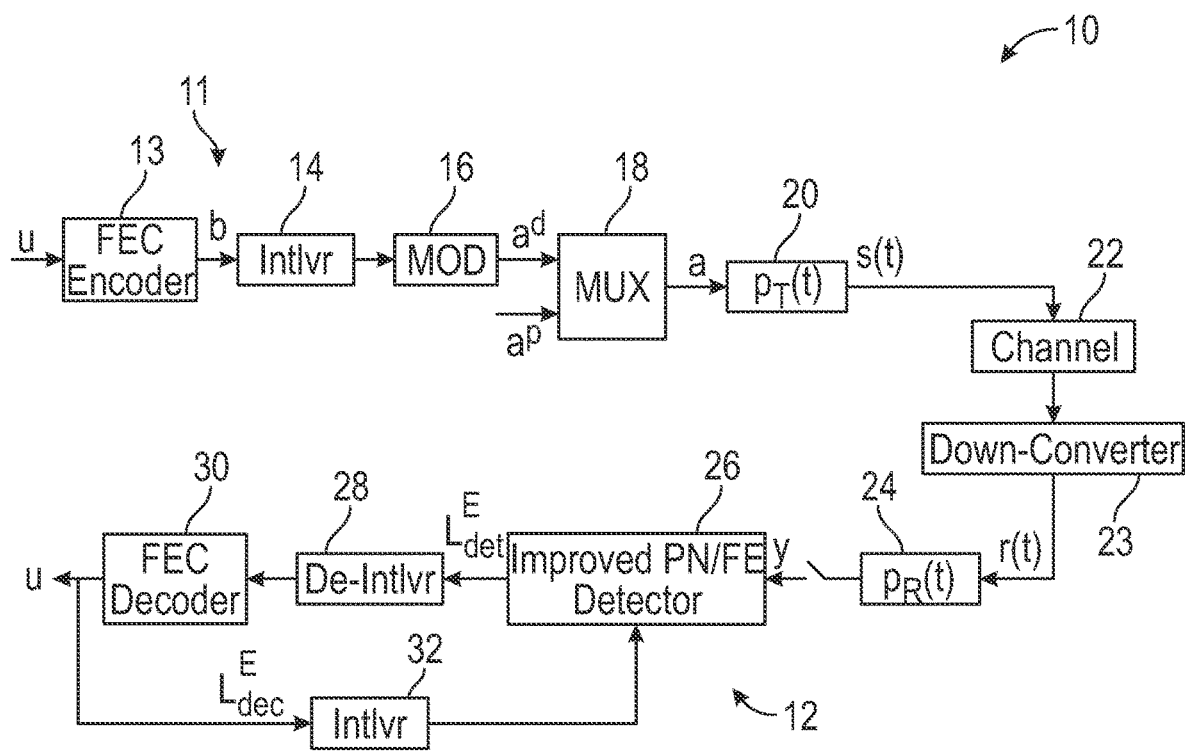
FIG. 1 illustrates an exemplary baseband system, including a transmitter, channel and receiver, in accordance with an implementation of the disclosure.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In contrast to the above-discussed conventional systems, a receiver is proposed herein that jointly tracks the phase noise and frequency error in a single stage, thereby eliminating a separate fine-frequency estimation stage and the associated overhead and acquisition time. The detector described herein adopts a canonical approach for the dual impairments of phase noise and frequency error, and generates reliable data symbol soft-estimates using only pilots. Furthermore, the detector described herein is iterative and incorporates updated soft-information feedback from the FEC decoder to further improve the symbol estimates. As such, improvements to the detector are introduced that improve performance in more challenging scenarios, such as when signaling using weak code rates in severe phase noise. Further, 4+8+4 APSK and 8+8+8+8 APSK modulations are disclosed herein which have fewer constellation points in the outermost ring compared to well-known alternatives, and which allow better Gray mapping.

In this disclosure, innovations and improvements are described that enable reliable signaling in the presence of strong phase noise and frequency offset. The main contributions include providing a single detector that can jointly track the phase noise and frequency error, thereby reducing the overhead required in conventional systems having separate fine frequency estimation and phase noise compensation stages. Having only a single detector also eliminates the additional acquisition time associated with the separate fine frequency estimation process of previous arrangements. The disclosed detector adopts a statistical model for the above described dual impairments and features novel improvements that are utilized in providing reliable a posteriori symbol probabilities in the presence of strong phase noise and frequency errors. In addition, the proposed single detector is applied in an iterative manner at the receiver, and hence benefits from soft-information exchanges with the FEC decoder. Improved modulation techniques are also disclosed that are employed in conjunction with the disclosed single detector in order to extract better energy efficiency. The resulting performance advantage is quantified herein using extensive computer simulations over realistic channels conditions.

More specifically, the purpose of this invention is to improve the energy efficiency and spectral efficiency in the presence of strong phase noise and frequency errors. As stated previously, oscillators employed for frequency conversion introduce time-varying angular distortion to the received symbols. The distortion is more severe in lower cost oscillators that are often employed to keep device costs in systems requiring such oscillators low. Unmitigated or inadequately mitigated phase noise and frequency offsets adversely impact the quality of the soft-information provided to the forward error correction (FEC) decoder, resulting in poor packet error rate (PER) performance and poor energy efficiency. Furthermore, the impact of phase noise is more deleterious to spectrally efficient modulations with large cardinality such as 16 APSK and 32 APSK that are specified in widely adopted satellite standards, i.e., DVB-S2 and DVB-S2X. The techniques proposed in this disclosure can help address the above problems by offering the benefits discussed below.

To begin with, the system and method discussed herein replaces the conventional method of having the two separate stages; the first for fine carrier frequency estimation and the second for phase noise compensation with a single joint detector, and eliminates additional overhead previously needed for the fine-frequency estimation stage. This serves to concurrently mitigate impact of phase noise and frequency error.

The disclosed system and method also provide robust packet error rate performance. The PER performance of the disclosed iterative detector is very close to the ideal performance of the MODCOD under consideration. This is observed even at very low symbol rates and/or for higher-order modulations (e.g., M=32) employing weak code rates. Also, the system and method disclosed herein is extremely versatile in terms of being applicable without algorithmic modifications to commonly used phase noise masks, such as those defined in DVB-S2 terminals. The disclosed detector also offers an excellent trade-off between pilot overhead and error rate performance. Still further, the system and method provide an improved energy efficiency. In particular, the disclosure defines 4+8+4 APSK and 8+8+8+8 APSK MOD-CODs that can offer better energy efficiency in strong phase noise.

Figure 2:
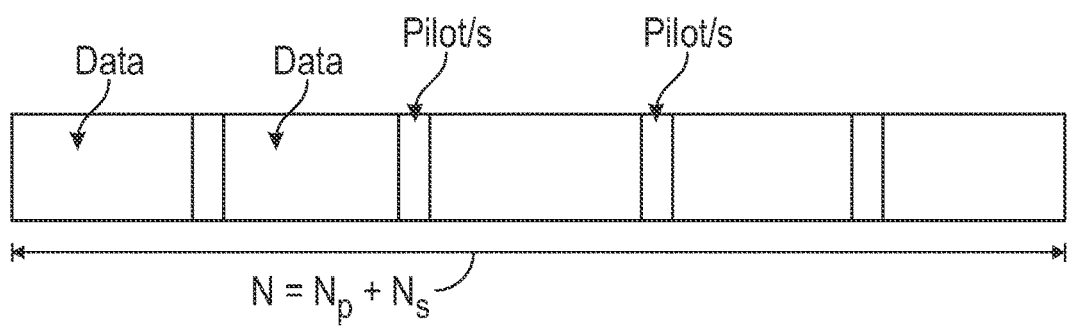
FIG. 2 illustrates an example of a transmitted burst in which pilot symbols are interspersed with data information symbols, in accordance with an implementation of the disclosure.

A baseband system 10 to implement the present disclosure is shown in FIG. 1, and includes a transmitter 11 and a receiver 12. The transmitter 11 includes a forward error correction (FEC) encoder 13 that receives data source transmitting information bits $u=[u_0, u_1, \ldots, u_{N_b-1}] \in \{0,1\}^{N_b}$ from a data source (not shown). The information bits u are encoded by the FEC encoder 13 to generate codebits $b=[b_0, b_1, \ldots, b_{N_c-1}] \in \{0,1\}^{N_c}$ which are bit-interleaved by an interleaver 14 and mapped onto an M-ary two-dimensional signal constellation by a modulator 16, using bit-to-symbol labelling, to generate the complex-valued symbol sequence $a^d=[\alpha_0^d, \alpha_1^d, \ldots, \alpha_{N_s-1}^d]$. Pilot symbols $a^p=[\alpha_0^p, \alpha_1^p, \ldots, \alpha_{N_p-1}^p]$ are multiplexed by the multiplexer 18 (MUX) with the data $a^d$ to form the composite vector a consisting of $N=N_p+N_s$ data and pilot symbols, such that $N_p \ll N_s$ to reduce overhead. The pilot density of the burst is defined as $N_p/N_s$. FIG. 2 shows an example of a transmitted burst in which pilot symbols are interspersed with data information symbols. The pilots shown in FIG. 2 for tracking and correcting the phase noise errors and pilots for tracking and correcting the frequency errors are common pilots (i.e., the same type of pilots).

The composite vector a is applied to an input of a transmit pulse shaping filter 20 which generates a baseband signal waveform s(t) at the output of the transmit pulse shaping filter 20. This waveform s(t) can be expressed as:

$$s(t) = \Sigma_k \alpha_k \cdot p_T(t-kT_s); \quad (1)$$

where $T_s$ is the symbol duration and when $p_T(t)$ and its receiver counterpart $p_R(t)$ are a pair of root-raised cosine (RRC) filters. The waveform s(t) is upconverted and transmitted through a channel 22 to the receiver 12.

At the receiver 12, a baseband signal r(t), after down-conversion by a down-converter, can be expressed as follows:

$$r(t) = s(t)e^{\wedge}(j(2\pi f\_e\, t+\theta(t))) + \tilde{n}(t); \quad (2)$$

where $\theta(t)$ is the phase noise and $f_e$ is the residual frequency error. $\tilde{n}(t)$ is zero-mean additive white Gaussian noise (AWGN) with single-sided power spectral density (PSD) of $N_0$ (Watt/Hz). Phase noise characteristic of the oscillators are most commonly specified in terms of a PN mask which plots the single-sideband noise spectrum in units of dBc/Hz as a function of frequency offset from the center frequency.

Figure 3:
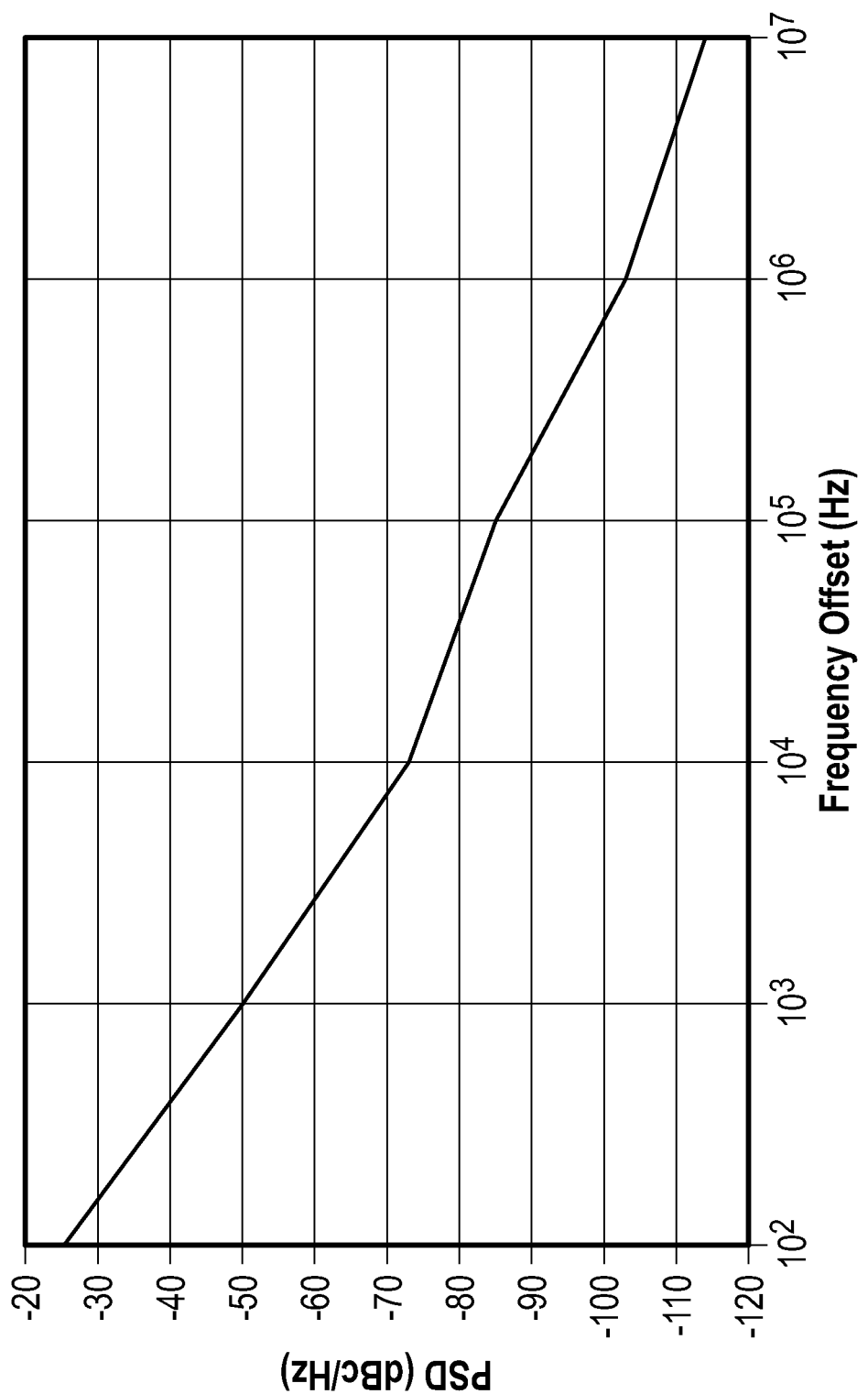
FIG. 3 illustrates a typical phase noise mask, in accordance with an implementation of the disclosure.

FIG. 3 displays a representative phase noise mask specified in a DVB-S2 standard. In essence, the plot of PSD vs. frequency offset shown in FIG. 3 shows how much a tone will be smeared for the transmitted signal. In particular, FIG. 3 shows the spread of frequency, i.e., the offset from the desired frequency of the transmitted signal. As will be discussed further below, the problems of offset from the desired frequency increase as the signal rates become lower.

Matched filtering in the match filter 24 of the receiver 12 follows next, such that the signal at an output of the match filter 24 is found to be:

$$y(t) = \int_{-\infty}^{\infty} r(\alpha) \cdot p^*_R(\alpha-t) d\alpha \quad (3)$$

In the absence of inter-symbol interference, the signal matched filter output of the match filter 24, when sampled at integer multiples of the symbol rate is given by $$y_n = \alpha_n e^{j(2\pi f_e n T_s + \theta_n)} + n'_n; n=0,1,\ldots, N-1 \quad (4)$$

and n' is bandlimited Gaussian noise with variance $N_0$. We further define $\Psi_n = 2\pi f_e n T_s$ and note that the matched filter output in equation (4) includes both the distorted information symbols and distorted pilot symbols. From equation (4), it is also evident that phase noise and frequency error distort the received signal r(t) by introducing a time-varying phase rotation to the modulation symbols. The extent of the distortion will depend on the phase noise mask and residual frequency error with higher order modulations being more susceptible to larger performance degradation.

Figure 4A:
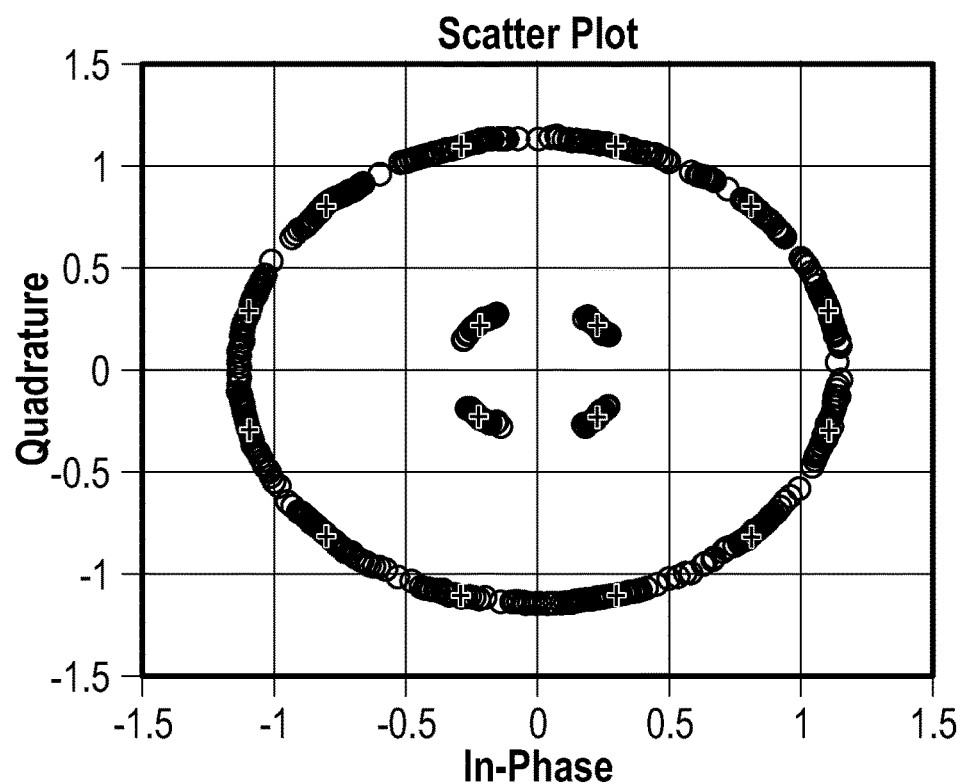
FIGS. 4(a) and 4(b) illustrate noiseless scatterplots at a matched filter output when 16 APSK (Amplitude and Phase Shift Keying modulation is received in the presence of strong phase noise, modelled using the mask specified in FIG. 3, in accordance with an implementation of the disclosure.
Figure 4B:
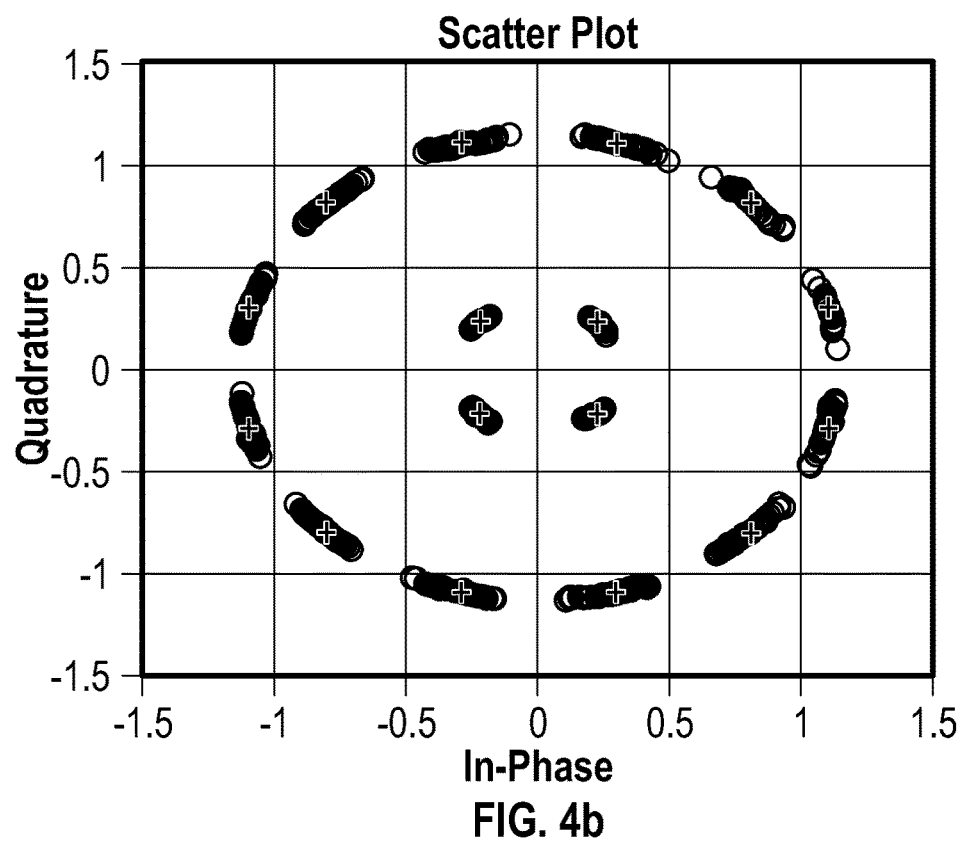

FIGS. 4(a) and 4(b) display noiseless scatterplots at the matched filter 24 output when 16 APSK modulation is received in the presence of strong phase noise, modelled using the mask specified in FIG. 3. In FIGS. 4(a) and 4(b), two different symbol rates are considered, specifically, 2 Msps in FIG. 4(a) and 10 Msps in FIG. 4(b). In FIGS. 4(a) and 4(b) the points marked with dark-colored dots are ideal ASPK constellation points. Significant angular distortion is observed which is worse at lower symbol rates, as can be appreciated from FIG. 4(a). It is also noted that the distortion affects the outer ring more than the inner ring, making it more challenging for higher-order modulations that arrange more points on the outermost rings. In the following description, an effective, low-complexity solution is described to enable reliable signaling in the presence of such severe distortion.

Referring again to FIG. 1, the samples y at the output of the matched filter 24 are fed to the improved detector PN/FE detector 26. The detector 26 operates to generate reliable soft (i.e. probabilistic) estimates of the transmitted data symbols, and then converts them to output bit-level log-likelihood ratios (LLR), denoted in FIG. 1 as $L_{det}^E$. The decoder 30 utilizes a de-interleaved version (via de-interleaver 28) of $L_{det}^E$ to generate estimates of the information bits by applying well-known decoding algorithms such as the Bahl-Cocke-Jelinek-Raviv (BCJR) algorithm or a sum-product algorithm. In the process, the decoder 30 also produces its own estimate of the transmitted codebits, denoted as $L_{dec}^E$ which is fed back, after interleaving in the interleaver 32, to the detector 26.

The feedback from the decoder 30 helps the detector 26 in refining and improving its own soft-symbol estimates and in updating $L_{det}^E$, which, in turn, will help the decoder 30 improve its own estimates of the information bits and the codebits. Soft-information is thus exchanged iteratively between the detector 26 and decoder 30. After a maximum number of iterations, the decoder 30 will output its final estimate of the information bits or hard-decisions, denoted as û. It is noted that the super-script E in the log-likelihood terms indicate the extrinsic nature of the soft-information, i.e., only propagates new information to the next stage by subtracting LLRs that the decoder 30 or detector 26 have already used in the previous iteration. In one implementation of the present disclosure, the number of iterations can be between 15-20, selected empirically as a trade-off between run time (or hardware speed), complexity, and error rate performance. However, the number of iterations can be set much higher, for example 50 or more, if error rate performance is determined to be more important than run time or complexity. In general, however, it is preferred to have as few iterations as possibly needed to meet a target error rate versus signal-to-noise ratio performance.

A canonical approach described previously is adopted and a Tikhonov model is assumed for phase noise and a discrete random variable model for the frequency error, where the Tikhonov pdf is defined as:

$$T(\theta; z) = \frac{1}{2\pi I_0(|z|)} e^{Re\{ze^{j\theta}\}} \quad (5)$$

where $I_0(\ )$ is the modified Bessel function of the first-kind and $0^{th}$ order. The circular mean pc and circular variance $v_c$ of this distribution are related to the parameter z and are defined as follows:

$$\mu_c = \arg\{z\} \quad (6)$$

$$v_c = 1 - \frac{I_1(|z|)}{I_0(|z|)} \quad (7)$$

where $I_1(\ )$ is the modified Bessel function of the first-kind and $1^{st}$ order. Adapting the discretized phase approach to track the frequency error, we assume that at any time instant n, the frequency error $\Psi_n$ can assume one of L values between the range $[-\Psi_{max}, \Psi_{max}]$, such that $-\Psi_{max} \leq \Psi(l) \leq \Psi_{max}$; l=1,2, . . . , L and define; $\mu_{fwd,k}{}^l = \rho(\Psi_k = \Psi(l)|y_0, \ldots, y_{k-1})$ and $\mu_{bkd,k}{}^l = \rho(\Psi_k = \Psi(l)|y_{k+1}, \ldots, y_{K-1})$. Further, adopting the Tikhonov model for the phase, we get $\rho(\theta_k|y_0, \ldots, y_{k-1}, \Psi_k = \Psi(l)) \propto T(\theta_k; \alpha_k{}^l)$ and $\rho(\theta_k|y_{k+1}, \ldots, y_{K-1}, \Psi_k = \Psi(l)) \propto T(\theta_k; \beta_k{}^l)$. It is noted that, in these equations, $\alpha$ is a statistical measure of the phase noise sample $\theta\_k$ givedn past channel observations and the current frequency error estimate, and $\beta$ is a statistical measure of the phase noise sample $\theta\_k$ given subsequent channel observation and the current frequency error estimate.

Under these assumptions, the disclosed detector 26 performs the following four operations in order to produce reliable LLRs in the presence of phase noise and frequency error:

(1) Branch metric update: At every time index, i.e., k=0, . . . , K-1, the branch metric, defined as $\gamma_k = \Sigma_{\chi \in S} P(\alpha_k{}^d = \chi) \cdot \rho(y_k|\alpha_k{}^d = \chi, \theta_k)$, is calculated. When the symbol index corresponds to the location of a pilot symbol, then $$\gamma_k = 2 \frac{y_k \cdot conj(a_k^p)}{N_0}.$$

Figure 5:
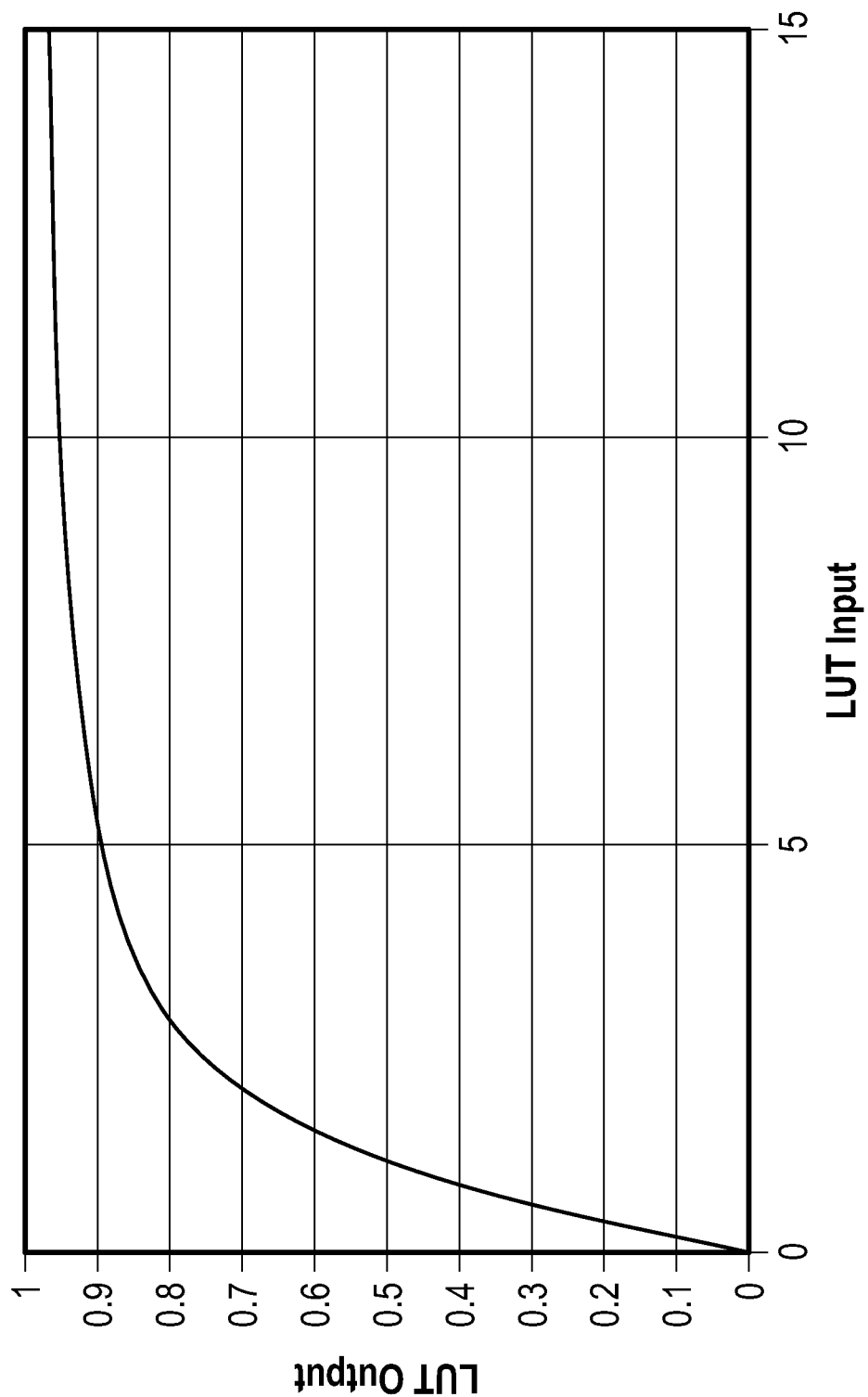
FIG. 5 illustrates a look-up table used in accordance with an implementation of the disclosure for making branch metric calculations.

For the data segments, an improved technique is used based on the circular mean and circular variance to approximate the Tikhonov mixture $\gamma_k$ as a single, complex Tikhonov parameter $\tilde{\gamma}_k = \Gamma(\gamma_k)$, where $\Gamma$ is the transformation operation. The inputs to $\Gamma$ are $\log P(\alpha_k{}^d = x_m)$, $$2\frac{y_k \cdot conj(x_m)}{N_0}, \frac{-|x_m|^2}{N_0};$$

where $x_m$; m=1,2, . . . M is one of M complex modulation symbols. By processing the above inputs and using the look-up table shown in FIG. 5, $y_k$ is computed, thereby providing improved branch metric calculations.

(2) Forward recursion: This operation is performed over time-index k=1, . . . , K-1. $\alpha_k{}^l$ and $\mu_{fwd,k}{}^l$ are updated recursively using $\alpha_{k-1}{}^l$, $\tilde{\gamma}_{k-1}$, $\rho(\theta_k|\theta_{k-1}, \Psi(l))$ and $\mu_{wd,k-1}{}^l$, $\tilde{\gamma}_{k-1}$, $\alpha_{k-1}{}^l$, respectively.

(3) Backward recursion: This operation is performed over time-index k=K-2, . . . ,0. Here, $\beta_k{}^l$ and $\mu_{bkd,k}{}^l$ are updated recursively from $\beta_{k+1}{}^l$, $\tilde{\gamma}_{k+1}$, $\rho(\theta_{k+1}|\theta_k, \Psi(l))$ and $\beta_{k+1}{}^l$, $\tilde{\gamma}_{k+1}$, $\mu_{bkd,k+1}{}^l$ respectively.

(4) Symbol APP and bit LLR calculation: The data symbol a posteriori probabilities APP $\rho(\alpha_k{}^d|y)$ are obtained by combining $\alpha_k{}^l$, $\beta_k{}^l$, $\mu_{fwd,k}{}^l$, $\mu_{bkd,k}{}^l$, $\rho(y_k|\alpha_k{}^d, \theta_k)$, over all l=1,2, . . . , L. The symbol APPs are transformed to bit-level LLRs using the mapping rule employed and converted to extrinsic information. More specifically, bit-level LLR are calculated as follows:

$$L_{det}[i] = \log \frac{P(b_i = 1 | y)}{P(b_i = 0 | y)} = \log \frac{\Sigma_{x \in S_{i,k}^{(1)}} P(a_k^d = x | y)}{\Sigma_{x \in S_{i,k}^{(0)}} P(a_k^d = x | y)}; \quad (8)$$

$$i = 0, 1, \ldots, N_c - 1;$$

where $S_{i,k}{}^{(q)}$ represents the subset of constellation symbols whose bit-position corresponding to the time-index pair (i, k) is labelled with q. $L_{det}{}^E$ is obtained by subtracting from (6) the interleaved $L_{dec}{}^E$ provided previously by the decoder. The a priori probabilities $P(\alpha_k{}^d)$ employed in Step 1 are derived from the interleaved extrinsic information $L_{dec}{}^E$ provided by the FEC decoder during the previous iteration using the bit-to-symbol mapping rule defined for the constellation. For efficient implementation, Step 1 and Step 2 are performed concurrently. Next, Step 3 and Step 4 are executed concurrently.

Figure 6:
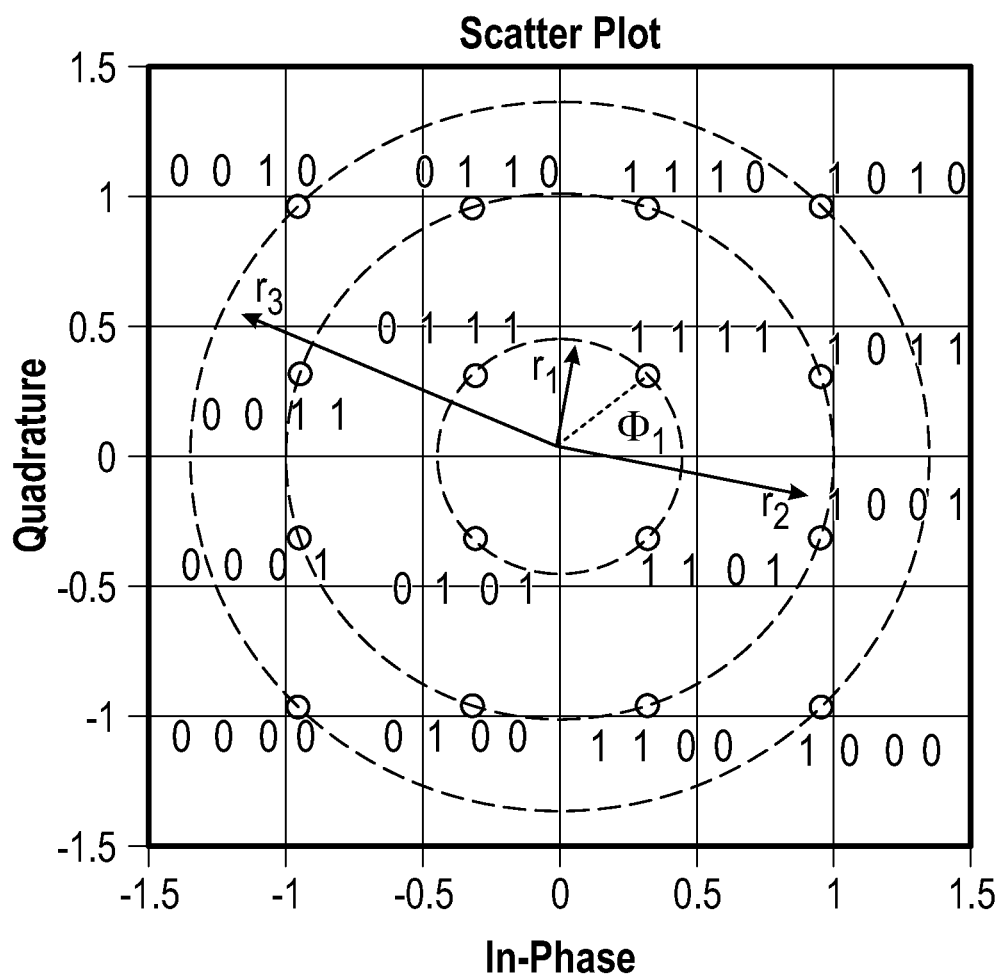
FIG. 6 illustrates a 4+8+4 APSK constellation diagram and a bit-to-symbol mapping rule, in accordance with an implementation of the disclosure.

FIG. 6 is a constellation diagram that displays 4+8+4 APSK modulation and bit-to-symbol mapping in accordance with an implementation of the present disclosure. The constellation diagram has 4 points in the inner-most and outer-most rings and 8 points in the second ring. The constellation points in the three rings can be obtained as:

$$s_1^i = r_1 \cdot e^{j\left(\frac{2\pi i}{4} + \phi_1\right)}; i = 0,1,2,3$$

$$s_2^i = r_2 \cdot e^{j\left(\frac{2\pi i}{8} + \phi_2\right)}; i = 0,1,\ldots,7$$

$$s_3^i = r_3 \cdot e^{j\left(\frac{2\pi i}{4} + \phi_3\right)}; i = 0,1,2,3$$

For the above formulas, values are set as follows: $r_1 = 0.45$, $r_2 = 1$, $r_3 = 1.35$ and $\phi_j = 0$; j=1,2,3. As seen in FIG. 6, Gray labelling is implemented such that the Hamming distance between two nearest constellation symbols is always 1.

Figure 7:
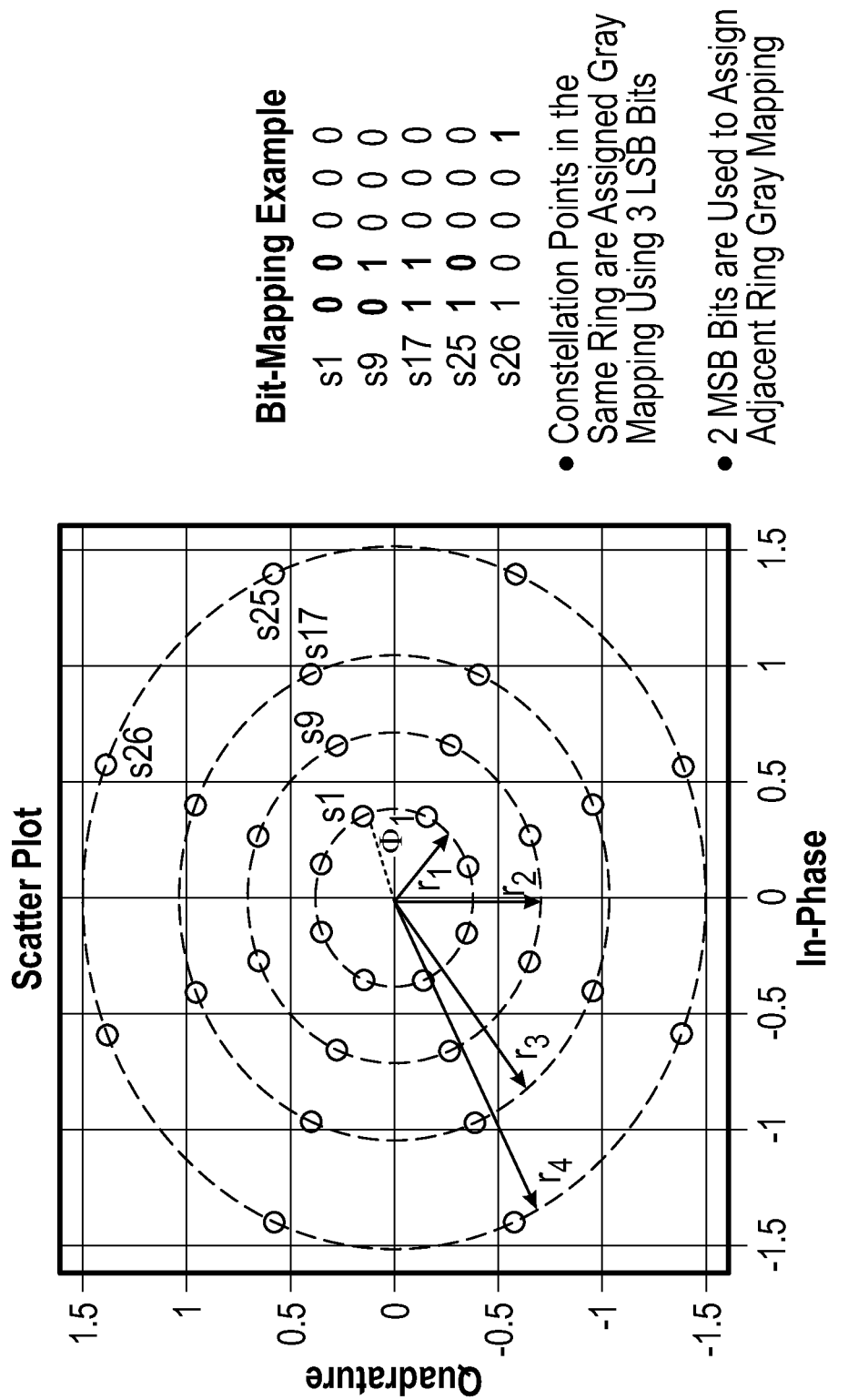
FIG. 7 illustrates an 8+8+8+8 APSK constellation diagram and a bit-to-symbol mapping rule, in accordance with an implementation of the disclosure.

FIG. 7 is a constellation diagram that displays 8+8+8+8 APSK modulation and bit-to-symbol mapping in accordance with another implementation of the present disclosure. The constellation has 8 points arranged on 4 concentric rings such that:

$$s_j^i = r_j \cdot e^{j\left(\frac{2\pi i}{8} + \phi_j\right)}; i = 0,1,\ldots,7; j = 1,\ldots,4$$

where $r_1 = 0.38$, $r_1 = 0.38$ $r_2 = 0.71$, $r_3 = 1.04$, $r_4 = 1.51$ and $\phi_j = 0$ $\forall j$.

In FIG. 7, Gray labelling is adopted such that the 3 least-significant bits (LSB) are used to assign Gray labelling to the 8 points within a ring and 2 most-significant bits (MSB) are used to assign Gray labelling between the 4 rings.

An extensive simulation study was carried out to demonstrate the effectiveness of the techniques described in this disclosure. The simulation setup implemented the transmitter 11 and receiver 12 shown in FIG. 1. LDPC codes were used for forward error correction. Interleaving and deinterleaving follow the block interleaver design similar to known arrangements. The RRC filter pair $p_T(t)$ and $p_R(t)$ had a roll-off factor of 0.1. Phase noise statistics at the receiver were assumed to follow the mask specified in FIG. 3. A frequency error in the range of +20 kHz was assumed to be present. The symbol rate was 1 Msps at which the impact of the phase noise is very severe, as can be inferred from the scatterplots displayed in FIG. 4. A maximum of 50 iterations was performed between the joint detector and the LDPC decoder. The number of internal decoder iterations was 1.

Figure 8A:
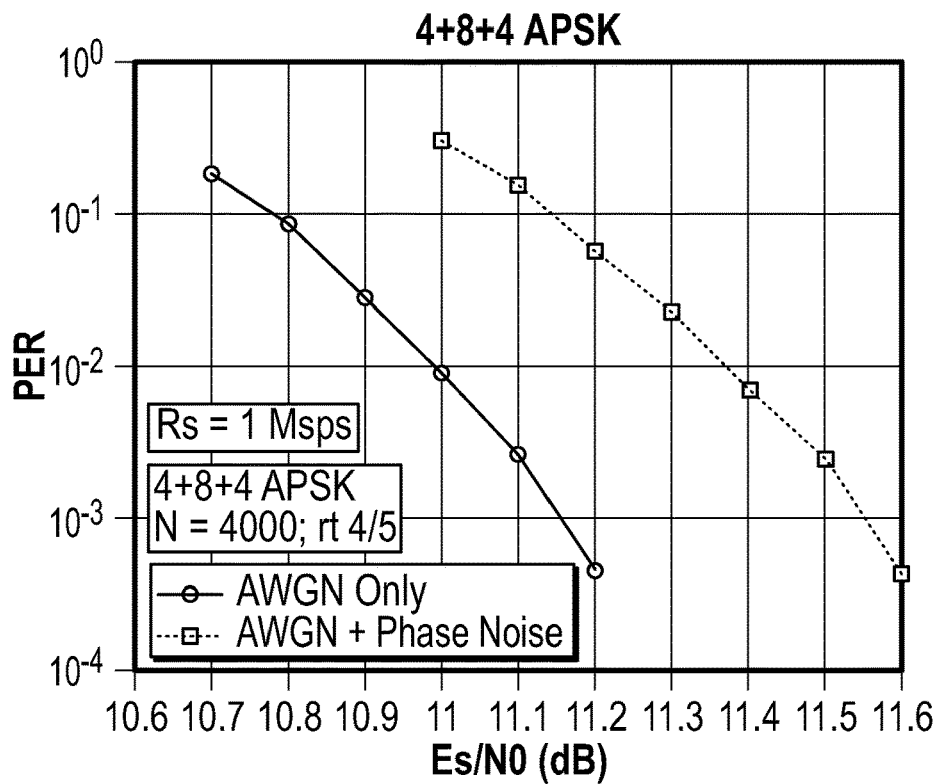
FIGS. 8(a) and 8(b) illustrate graphs of PER vs. Es/N0 performance with the detector disclosed herein in the presence of strong phase noise, in accordance with an implementation of the disclosure.
Figure 8B:
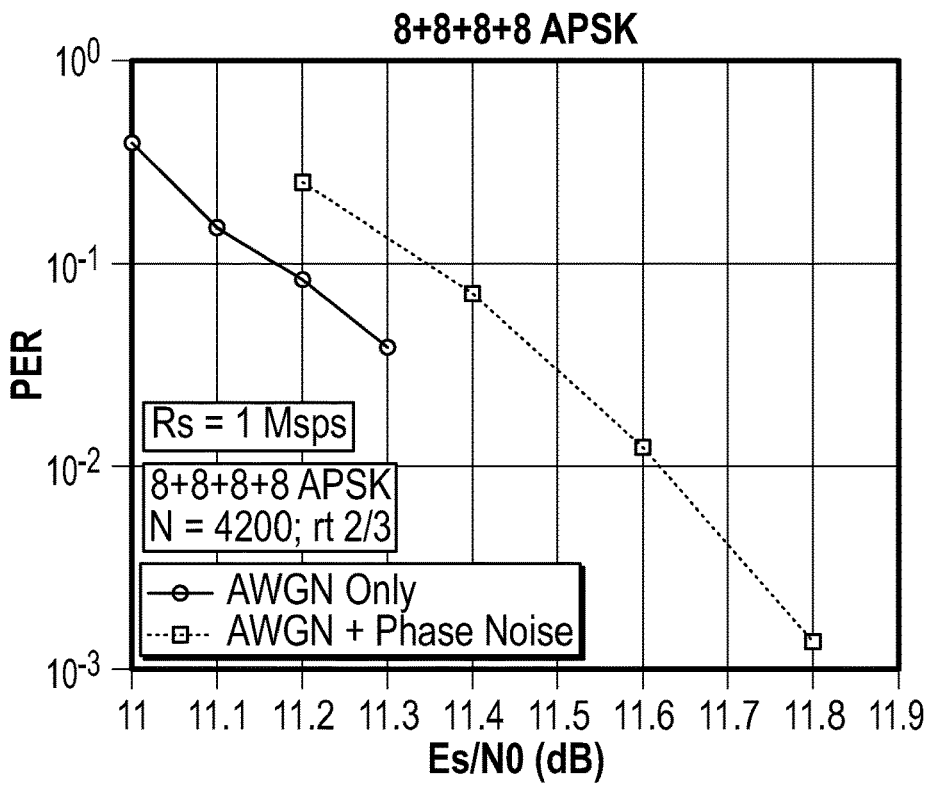

FIGS. 8(a) and 8(b) document the PER performance of the simulation as a function of the signal-to-noise ratio, defined as the ratio of the average signal power (Es) to the noise power spectral density NO (Watt/Hz), i.e. $E_s/N_0$ in the presence of very strong phase noise. FIG. 8(a) considers the scenario when 4+8+4 APSK is transmitted using a rate 4/5 LDPC code having a blocklength of N=4000 bits. The pilot density is 0.05. Despite the severe phase noise and weak code, the simulated detector offers excellent energy efficiency whose performance is within 0.4 dB of the ideal performance in AWGN. FIG. 8(b) examines the performance of 8+8+8 APSK encoded by a rate 2/3 coding with a blocklength of N=4200. The pilot density is 0.054. For this scenario the performance is within 0.2 dB of the no phase noise case.

Figure 9:
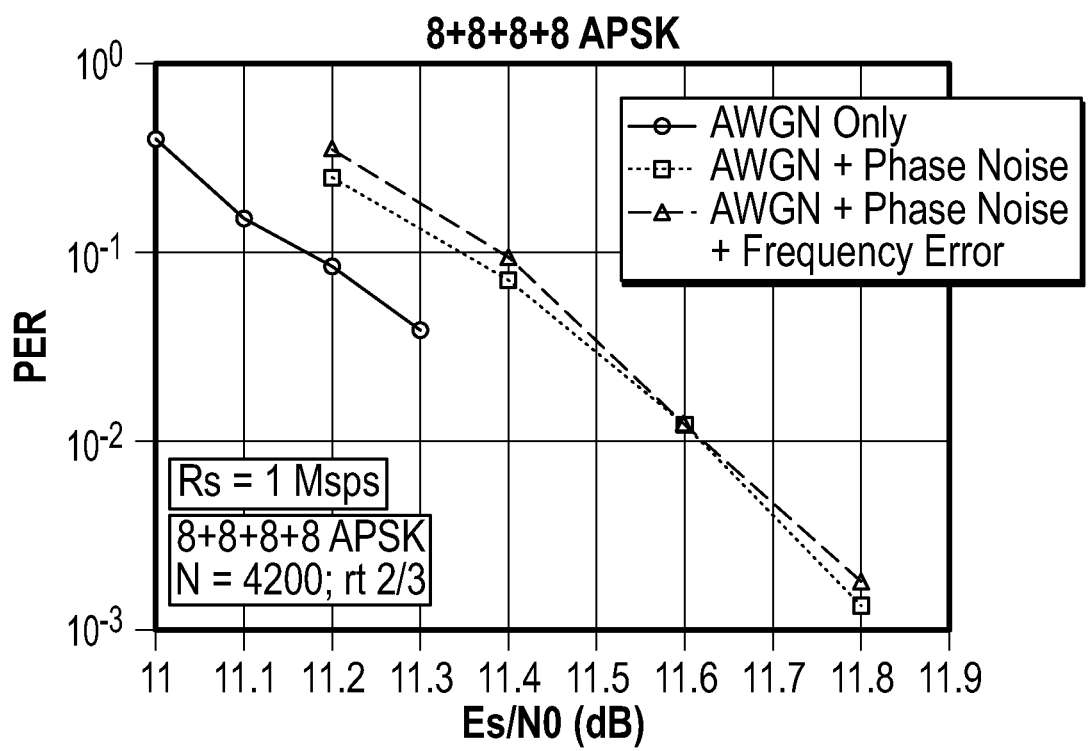
FIG. 9 illustrates a graph of PER vs. Es/N0 performance with the detector disclosed herein in the presence of strong phase noise and frequency error, in accordance with an implementation of the disclosure.

The performance of the improved detector of the present disclosure in the presence of the dual impairments of phase noise and frequency error is examined in FIG. 9. The modulation, code parameters and pilot density are identical to those considered in FIG. 8(b). It is noted that the performance is identical to that obtained when a phase noise only scenario is considered, indicating that the disclosed framework successfully tackles phase noise and frequency error in a single detector.

Figure 10A:
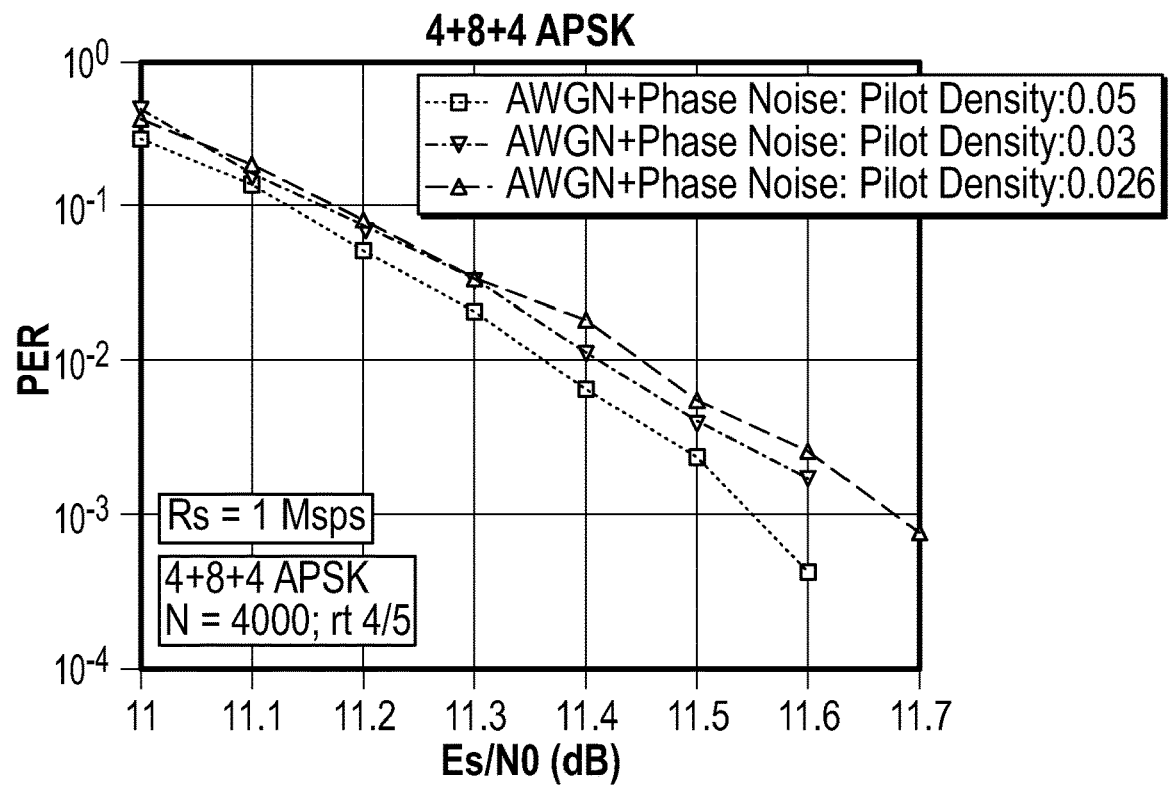
FIGS. 10(a) and 10(b) illustrate graphs of PER vs. Es/N0 performance with the detector disclosed herein in the presence of strong phase noise as a function of pilot density, in accordance with an implementation of the disclosure.
Figure 10B:
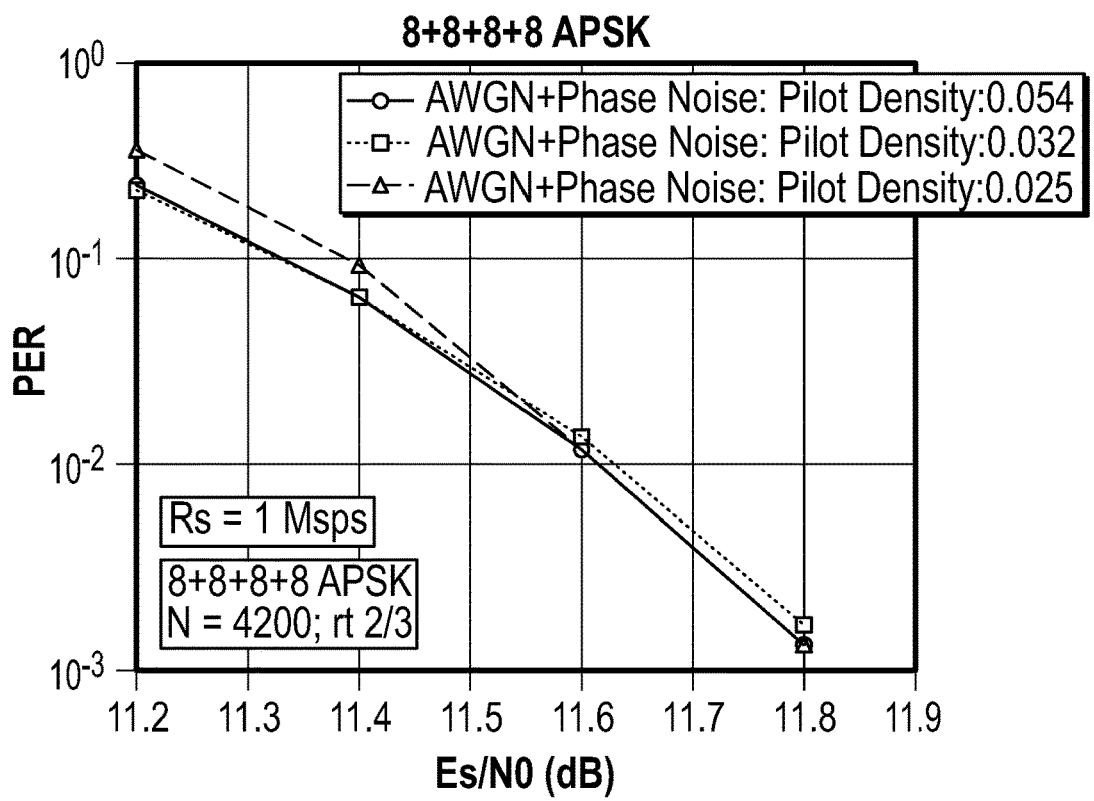

FIGS. 10(a) and 10(b) demonstrate the robustness of the disclosed detector to a reduction in the number of pilot symbols. It is seen that even reducing the number of pilots by half has only a minimal impact on performance.

Figure 11A:
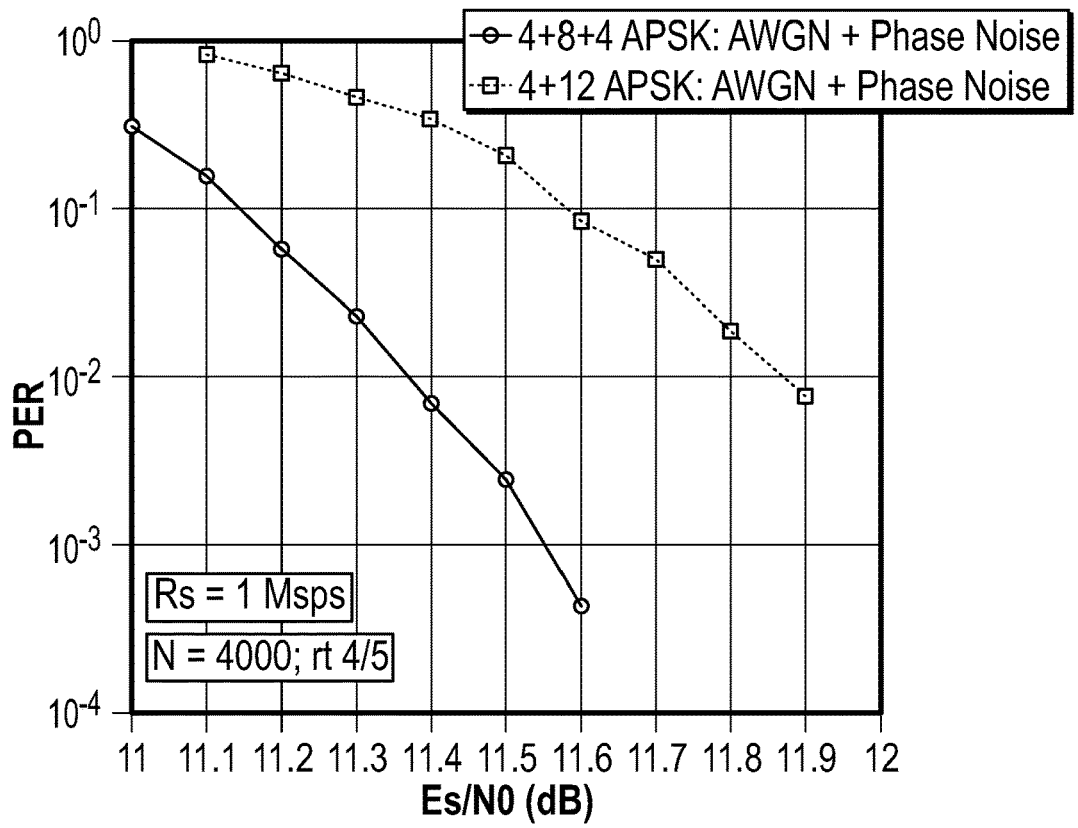
FIGS. 11(a) and 11(b) illustrate graphs of PER vs. Es/N0 performance comparison with the detector disclosed herein with 4+12 APSK and 4+12+16 APSK in the presence of strong phase noise, in accordance with an implementation of the disclosure.
Figure 11B:
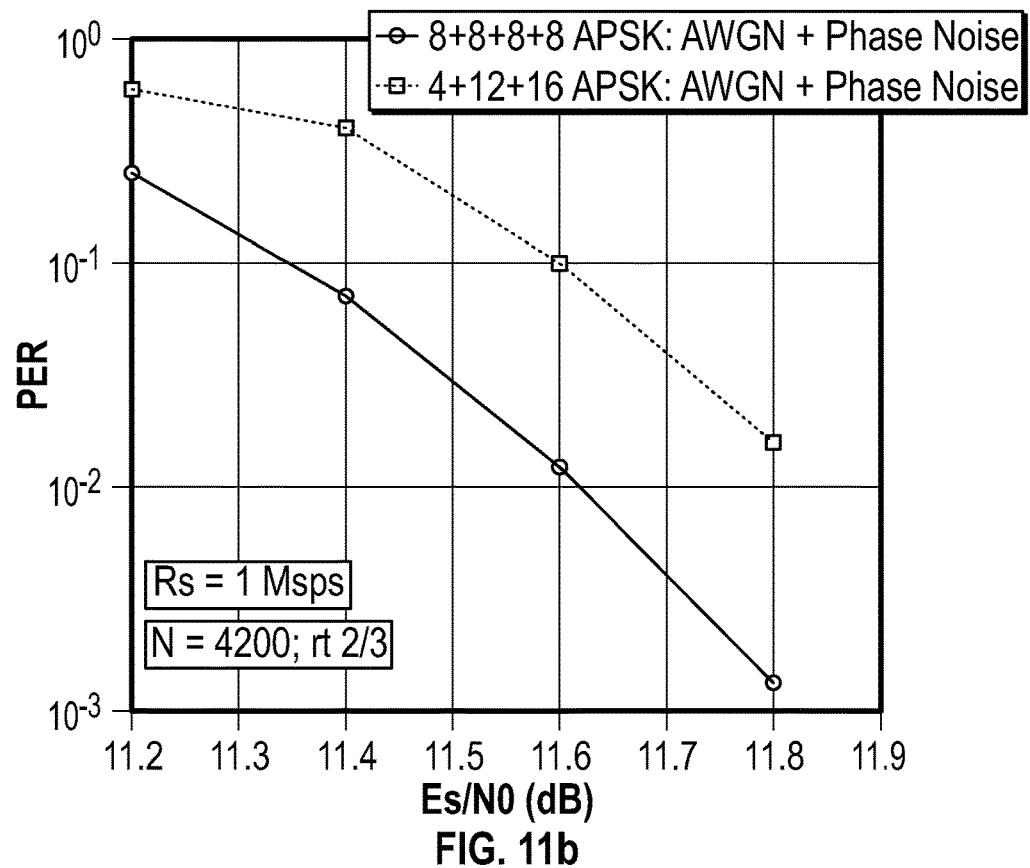

In FIGS. 11(a) and 11(b), the improvements offered by the 4+8+4 APSK constellation and the 8+8+8+8APSK constellation in strong phase noise are shown. As seen in FIG. 11(a), for the disclosed detector, 4+8+4 APSK is approximately 0.5 dB better than the well-known 4+12APSK. Similarly, FIG. 11(b) indicates that the 8+8+8+8 APSK modulation is close to 0.3 dB better than well-known 4+12+16 APSK.

While various embodiments have been described, the description is intended to be exemplary, rather than limiting, and it is understood that many more embodiments and implementations are possible that are within the scope of the embodiments.

Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method comprising:
   receiving, at a receiver, a communication signal, including data, from a transmitter via a communication channel; and
   jointly tracking and jointly correcting phase noise errors and frequency errors in the communication signal with a joint detector using an iterative feedback correction process between an output decoder of the receiver and the joint detector.

2. The method of claim 1, wherein the joint tracking and joint correcting of both phase noise errors and frequency errors in the communication signal are carried out in the joint detector using pilots, interspersed between data in the communication signal.

3. The method of claim 2, wherein the iterative feedback correction process includes a branch metric update step for updating a branch metric in the joint detector.

4. The method of claim 2, wherein the iterative feedback correction process includes a symbol a posteriori probabilities (APP) calculation and bit log likelihood ratio (LLR) calculation step.

5. The method of claim 4, wherein the iterative feedback correction process further includes a forward recursion step and a backward recursion step.

6. The method of claim 5, wherein the branch metric update step and the forward recursion step are performed concurrently.

7. The method of claim 5, wherein the backward recursion step and the symbol APP calculation and bit LLR calculation step are performed concurrently.

8. The method of claim 5, wherein the backward recursion step and the symbol APP calculation and bit LLR calculation step are performed concurrently, after the branch metric update step and the forward recursion step are performed concurrently.

9. The method of claim 1, further comprising outputting a final estimate of information bits in the data in the communication signal from the output decoder of the receiver after a predetermined maximum number of iterative steps of the iterative feedback correction process has been reached.

10. A receiver in a communication system comprising:
    a filter of the receiver configured to receive a communication signal, including data, from a transmitter via a communication channel; and
    a joint detector including an output and a feedback input and
    an iterative feedback loop comprised of an output decoder coupled between the output of the joint detector and the feedback input of the joint detector,
    wherein the joint detector is configured to jointly track and jointly correct phase noise errors and frequency errors in the communication signal using an iterative feedback correction process via the iterative feedback loop.

11. The receiver of claim 10, wherein the joint detector configured to jointly track and jointly correct both phase noise errors and frequency errors in the communication signal uses pilots, interspersed between data in the communication signal.

12. The receiver of claim 11, wherein the iterative feedback correction process includes a branch metric update step for updating a branch metric in the joint detector.

13. The receiver of claim 11, wherein the iterative feedback correction process includes a symbol a posteriori probabilities (APP) calculation and bit log likelihood ratio (LLR) calculation step.

14. The receiver of claim 13, wherein the iterative feedback correction process further includes a forward recursion step and a backward recursion step.

15. The receiver of claim 14, wherein the branch metric update step and the forward recursion step are performed concurrently.

16. The receiver of claim 14, wherein the backward recursion step and the symbol APP calculation and bit LLR calculation step are performed concurrently.

17. The receiver of claim 14, wherein the backward recursion step and the symbol APP calculation and bit LLR calculation step are performed concurrently, after the branch metric update step and the forward recursion step are performed concurrently.

18. The receiver of claim 10, wherein the output decoder is configured to output a final estimate of information bits in the data in the communication signal after a predetermined maximum number of iterative steps of the iterative feedback correction process has been reached.

19. The receiver of claim 10, wherein the communication signal received from the transmitter via the communication channel is down converted by a down converter in the receiver prior to being applied to the filter of the receiver.

* * * * *